(12) United States Patent
Melzner et al.

(10) Patent No.: US 9,182,106 B2
(45) Date of Patent: Nov. 10, 2015

(54) DEVICE FOR ADJUSTING AN OPTICAL TUBE ARRANGED IN THE HOUSING OF A HEADLIGHT OR OPTICAL DEVICE

(75) Inventors: Erwin Melzner, Frasdorf (DE); Michael Jonischkeit, Alxing (DE); Anton Hundhammer, Soechtenau (DE); Klaus-Dieter Stegmaier, Viechtach (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 208 days.

(21) Appl. No.: 14/007,436

(22) PCT Filed: Apr. 11, 2012

(86) PCT No.: PCT/EP2012/056537
§ 371 (c)(1),
(2), (4) Date: Nov. 25, 2013

(87) PCT Pub. No.: WO2012/140051
PCT Pub. Date: Oct. 18, 2012

(65) Prior Publication Data
US 2014/0092592 A1    Apr. 3, 2014

(30) Foreign Application Priority Data
Apr. 11, 2011    (DE) .......................... 10 2011 007 131

(51) Int. Cl.
*F21V 14/06*    (2006.01)
*F21V 14/08*    (2006.01)
(Continued)

(52) U.S. Cl.
CPC ................. *F21V 14/00* (2013.01); *F21V 14/06* (2013.01); *F21V 17/02* (2013.01); *G02B 7/04* (2013.01); *F21V 14/08* (2013.01); *F21W 2131/406* (2013.01); *G03B 15/06* (2013.01)

(58) Field of Classification Search
CPC ......... F21V 14/00; F21V 14/06; F21V 14/08; F21V 17/02; F21W 2131/406; G02B 7/04; G03B 15/06
See application file for complete search history.

(56) References Cited

U.S. PATENT DOCUMENTS 2,104,911 A * 1/1938 Snyder .......................... 340/480
3,324,781 A   6/1967 Clös
(Continued)

FOREIGN PATENT DOCUMENTS

DE    260 581 A1    9/1988
DE    691 04 486 T2    6/1995
(Continued)

OTHER PUBLICATIONS

English translation of the International Preliminary Report on Patentability for International Application No. PCT/EP2012/056537, dated Oct. 17, 2013, 7 pages.
(Continued)

*Primary Examiner* — Alan Cariaso
(74) *Attorney, Agent, or Firm* — Christie, Parker & Hale, LLP (57) ABSTRACT

A device for adjusting an optical tube, which is disposed in a housing of a spotlight or optical device and which is guided in the housing in the direction of the optical axis of the spotlight or optical device is provided. An adjustment drive, an operating element and a brake device is disposed between the tube and the housing, which with the adjustment drive not activated connects the tube to the housing in a non-positive locking and/or positive-locking manner and which on activation of the adjustment drive releases the connection between the tube and the housing and enables adjustment of the tube along the optical axis of the spotlight or optical device.

20 Claims, 6 Drawing Sheets (51) Int. Cl.
*F21V 14/00* (2006.01)
*G02B 7/04* (2006.01)
*F21V 17/02* (2006.01)
*F21W 131/406* (2006.01)
*G03B 15/06* (2006.01)

(56) References Cited

U.S. PATENT DOCUMENTS

| | | | | |
|---|---|---|---|---|
| 5,083,253 | A | * | 1/1992 | Hahnel .................. 362/306 |
| 5,351,925 | A | | 10/1994 | Druais |
| 5,354,030 | A | * | 10/1994 | Harwood ............... 248/316.1 |
| 6,092,914 | A | | 7/2000 | Esakoff et al. |
| 6,273,590 | B1 | * | 8/2001 | Splane, Jr. ............. 362/304 |
| 6,744,693 | B2 | | 6/2004 | Brockmann et al. |
| 2002/0060911 | A1 | | 5/2002 | Brockmann et al. |
| 2005/0265024 | A1 | * | 12/2005 | Luk ....................... 362/231 |
| 2008/0137345 | A1 | | 6/2008 | Wimberly |
| 2012/0155102 | A1 | | 6/2012 | Melzner et al. |

FOREIGN PATENT DOCUMENTS

| | | |
|---|---|---|
| DE | 699 10 586 T2 | 8/2004 |
| DE | 20 2006 006 715 U1 | 8/2006 |
| DE | 601 29 048 T2 | 2/2008 |
| DE | 20 2008 006 065 U1 | 8/2008 |
| EP | 1 293 722 A1 | 3/2003 |
| EP | 1 097 341 B1 | 8/2003 |
| WO | WO 99/67569 | 12/1999 |
| WO | WO 2011/020920 A1 | 2/2011 |

OTHER PUBLICATIONS

Verbindungstechnik, Wikipedia, Feb. 1, 2012, 3 pages.
International Search Report of corresponding PCT/EP2012/056537, dated Oct. 2, 2012, 6 pages.

* cited by examiner

DEVICE FOR ADJUSTING AN OPTICAL TUBE ARRANGED IN THE HOUSING OF A HEADLIGHT OR OPTICAL DEVICE

CROSS-REFERENCE TO A RELATED APPLICATION

This application is a National Phase patent application and claims priority to and benefit of International Patent Application Number PCT/EP2012/056537, filed on Apr. 11, 2012, which claims priority to and benefit of German Patent Application Number 10 2011 007 131.8, filed on Apr. 11, 2011, the entire disclosures of which are incorporated herein by reference.

BACKGROUND

Spotlights and other optical devices, such as telescopes and microscopes, contain an optical tube with a lens or a lens system of multiple lenses, which are either fixed in the tube or movably disposed therein. For optical reasons it can be necessary not no move the lens or the lens system within the tube for focusing and defocussing, but to move the tube together with the fixed installed lens or the lens system relative to the housing of the Spotlight or optical device. This is especially true if the edge of the tube would interfere with the optical path by partially blocking the same when adjusting the lens or the lens system within the tube. For example, microscope objectives and a number of photographic objectives are assembled according to this principle of construction.

In order to ensure exact adjustment of the Spotlight or optical device, accurate guidance and movement of the tube relative to the housing accommodating the tube is necessary. Two basic embodiments are known for this purpose.

In a first embodiment a screw thread is provided for adjusting the tube, whereby the housing is provided with an internal thread, whereas the optical tube comprises an external thread that matches the internal thread. An adjustment of the tube along the optical axis of the Spotlight, or optical device takes place by rotating the tube relative to the housing, wherein the pitch of the screw thread determines the displacement of the tube during the adjustment.

With this embodiment it is disadvantageous for one thing that a large number of rotations are necessary in order to displace the tube by a certain amount, and for another thing that because of the use of a screw mechanism the tube and the housing must have a circular outer cross-section or inner cross-section.

In order to enable any cross-sectional shape for the tube and the housing, e.g. a square tube and a square housing, in a second embodiment the adjustment of the tube takes place by means of a linear drive, with which the tube can be displaced along the optical axis of the Spotlight or optical device without twisting relative to the housing. Such a linear drive consists e.g. of a toothed rack connected to the tube or formed on the outer surface of the tube, which is driven by a pinion that is connected to a rotation axle, which comprises a rotary knob for manual operation and adjustment of the tube. This principle of construction is e.g. used for simple microscopes.

It is disadvantageous with this embodiment that depending on the inclination of the tube and of the housing a variable weight acts on the tube, which can cause the tube to move away from the selected adjustment into the housing or out of the housing if the toothed rack transmission has no or too little self-locking.

This is especially the case for the use of a linear drive for linear tube adjustment for a powerful Spotlight, e.g. for displacing a Fresnel lens relative to a light, generation unit. Here such heavy weights occur that a high degree of self-locking of the linear drive is necessary. However, a high degree of self-locking of the linear drive causes an increase of the force required to adjust the tube, whereby the operation for adjustment of the tube is made considerably more difficult. Because powerful spotlights generally have a large diameter and are associated with heavy accessories, such as e.g. metal swing gates and glass diffuser disks, which have to be moved into each operating position, the use of a simple rack and pinion gear for tube adjustment is excluded, because the forces required for operating the spotlight are too large.

SUMMARY

The object of the present invention is to specify a device for adjusting a tube of a spotlight or optical device of the above-mentioned type, which enables the linear, smooth and accurate movement of an optical tube with optional cross-sectional shape and a displaced mass of multiple kilograms, occupies a small installation space, ensures the maintenance of the selected tube adjustment in all operating positions and by the use of simple components, especially by the use of standard parts, gives rise to low production costs.

The solution according to the invention, provides a device for adjusting a tube of a spotlight or optical device that enables linear, smooth and accurate movement of an optical tube with any cross-sectional shape and a displaced mass of multiple kilograms, occupies only a small, installation space and ensures the maintenance of the selected tube adjustment in all operating positions, especially even with a highly inclined spotlight or optical device. By the use of simple components, especially by the use of standard parts, low production costs are enabled.

The solution according to the invention is based on the fact that either a self-locking transmission or a suitable brake device is necessary for the use of a linear drive for smooth and accurate movement of an optical tube with any cross-sectional shape and a displaced mass of the order of magnitude of multiple kilograms. Here a brake device, e.g. designed as a disk brake or a conical brake, can be adapted to the respective requirements and structurally designed in a simple manner.

It is disadvantageous here that the brake device requires a dedicated actuating mechanism, which is to be provided in addition to the actuating mechanism for adjusting the tube, because the tube can only be moved if the brake of the brake device is released, wherein sometimes the entire weight has to be moved. On achieving the desired adjustment, the brake of the brake device must then be activated again, so that single-handed operation under load conditions cannot be carried out or can only carried out with considerable difficulty.

A second actuating mechanism is especially disadvantageous if it is a spotlight that is mounted in a suspended manner in a typical studio or theatre installation. In order to carry out an adjustment of the spotlight or tube, for the corresponding height of the suspension the operator must climb a ladder so that one hand is needed to hold on and therefore only one hand is free for the adjustment of the focus. A second actuating mechanism is also disadvantageous if the adjustment and brake devices are to be electrically remotely controlled, because a plurality of motors, electromagnets or similar and possibly also a plurality of electronic control circuits are necessary.

Self-locking transmissions that fulfill the above-mentioned requirements for braking or self-locking and thus maintaining the tube adjustment, even with a moving mass of the order of magnitude of multiple kilograms, and enable one-handed operation, are worm and spindle gears. With worm gears the adjustment takes place by means of rotation of the worm wheel that engages in a toothed rack, which is attached to the tube or is formed on the tube in the adjustment direction. By using a small pitch of the teeth the forces occurring can be easily taken up and an adjustment of the tube is possible with the exertion of little force. Because the rotation axle extends parallel to the tube, it can be advantageous to carry out a change of direction to a drive axle with a rotary knob by means of another transmission, such as e.g. a conical transmission.

With a spindle gear the worm wheel is replaced by a threaded spindle, wherein the tube comprises a journal, a bolt or similar that engages in the curved track of the spindle and with which the tube is moved back and forth. Also here, with a suitable design of the pitch a good compromise can be achieved between self-locking and drive force.

However, both the worm gear and also the spindle gear have the disadvantage that the gear ratio from the drive axle to the movement of the tube is unfavorable. I.e., the better the self-locking, the smaller the pitch must be and the more revolutions of the drive axle are necessary in order to displace the tube by a certain distance. Because the operators of professional spotlights are used to adjusting the lens or the tube and thus the radiation angle of the spotlight with one to three revolutions, even the use of a worm gear or of a spindle gear is not advantageous.

The solution according to the invention for adjusting a tube disposed in a housing of a spotlight or optical device, which is guided in the direction of the optical axis of the spotlight or optical device in the housing, for providing an adjustment drive disposed between the tube and the housing, which is coupled to a brake device, which connects the tube to the housing in a non-positive locking and/or positive-locking manner with the adjustment drive not activated, on activating the adjustment drive releases the connection between the tube and the housing and enables adjustment of the tube along the optical axis of the spotlight or optical device, wherein the adjustment drive especially consists of a linear drive with a positive locking element connected to the tube, oriented parallel to the optical axis of the spotlight or optical device and an adjustment element connected to the housing and engaged with the positive-locking element, solves the above-mentioned problems by separating the adjusted state of a tube from a change of the tube adjustment.

As a result of said separation the tube is on the one hand fixed in the adjusted state with maximum brake force, so that the respective tube adjustment is guaranteed in all operating positrons of the spotlight or optical device, whereas on the other hand only small adjustment forces are necessary for adjusting the tube and the nature of the adjustment can be designed such that the linear, smooth and accurate movement of an optical tube is enabled with any cross-sectional shape with substantially free choice of the gear ratio between the adjustment of the adjustment element and the adjustment displacement of the tube.

At the same time, separation of the adjusted state of a tube from a change of the tube adjustment enables one-handed operation or the use of a single operating element, which can be remotely controlled by connecting it to an electric motor drive.

One advantageous embodiment of the solution according to the invention is characterized in that the positive locking element consists of a toothed rack disposed on the outer surface of the tube and oriented parallel to the optical axis of the spotlight or optical device and the adjustment element consists of a pinion that meshes with the teeth of the toothed rack, which is connected to a manually driven or motorized axially displaceable rotation axle so as to rotate therewith, wherein the axle can preferably be coupled to a manually driven or motor-driven operating element by means of a control device that activates or deactivates the brake device.

Said preferred embodiment of the invention is especially characterized by a small installation space, i.e. a small space requirement, the use of simple, especially standard parts and thus by low production costs, as well as by the need for only one drive axle, which can be single-channel remotely controlled using a motor or in another way.

In order to generate a large brake force with small dimensions of the brake device, the brake device consists of a hollow conical brake bearing attached to the housing and a brake cone connected to the rotation axle and disposed within the hollow conical brake bearing, which with axial adjustment of the rotation axle in the one direction makes a non-positive locking connection to the hollow conical brake bearing and in the opposite direction removes the positive locking connection to the hollow conical brake bearing.

For this reason the mutually opposed surfaces of the brake cone and of the brake bearing have a high coefficient of friction.

In order to generate an adequate braking effect without enlarging the friction area of the brake cone and of the brake bearing, according to another feature the brake cone and the brake bearing have opposing profiled surfaces, so that clamping is achieved between the brake cone and the brake bearing.

As an alternative the surfaces of the brake cone and of the brake bearing can be provided with a soft bearing material, e.g. with rubber, whereby a large braking effect is generated, but this has associated increase in wear or the risk of shearing.

Because when initiating an adjustment of the tube by deactivating the brake device the current adjustment of the tube must be maintained, even for adverse operating positions, until the brake device is fully disengaged or deactivated, a strong base friction or braking of the tube in its guide is necessary, without this leading to a significant increase in the forces for adjusting the tube. The force with which the tube resists an unwanted movement must therefore be the greatest force by far that acts on the tube when initiating an adjustment movement.

The requirement that the combined force of the base friction and braking of the tube, or the resistance of the tube against an unwanted movement, must be by far the greatest force in order to hold the tube in its respective adjustment until the brake device is disengaged is fulfilled in that in a simple embodiment the static friction of the guide rails is greater than the frictional force between the brake cone and the brake bearing of the brake device, which can be connected to the brake cone in a non-positive locking manner.

Because during mass production the above-mentioned static friction of the guide rails may not be able to be set with the required accuracy, it can be advantageous to design the tube guide to be substantially frictionless and thus to provide the tube with an additional brake, but one that is defined in terms of force. This can e.g. be achieved in that the tube moves, similarly to withdrawing drawers on a lubricated track, on plastic sliding surfaces with particularly low friction or with the use of balls or rollers, but that its movement is restricted by using a conventional frictional, brake with known properties. It would also be conceivable to place another brake cone on the drive axle that is pretensioned by a spring and thus permanently opposes the independent movement of the tube with a defined force.

A structurally simple solution for the control device is characterized by a control pin protruding from the rotation axle, which engages in a control guide of the operating element, wherein the control guide is designed such that in a neutral rest position the rotation axle is axially oriented such that the brake cone is connected to the brake bearing in a non-positive locking and/or positive-locking manner, and is axially displaced when driving the operating element, in one or other rotation direction such that the non-positive locking and/or the positive locking of the brake cone to the brake bearing is released, wherein the control guide is formed on a cylindrical fitting of the operating element, which receives an end of the rotation axle with the control pin and can be displaced rotationally relative to the rotation axle, and a spring element, which biases the brake cone in the non-positive locking and/or positive locking connection to the brake bearing, is disposed between the fitting and the pinion connected to the rotation axle bearing.

In order to enable tube adjustment from both sides of a spotlight or optical device, the positive-locking element consists of two toothed racks at a distance apart on the outer surface of the tube and oriented parallel to the optical axis of the spotlight or optical device and the adjustment element consists of pinions that mesh with the teeth of the toothed racks, which are connected to a manually driven or motor-driven, axially displaceable rotation axle so as to rotate with it, wherein both ends of the rotation axle comprise a control in protruding perpendicularly from the rotation axle and the control pins engage in a respective control guide in a fitting on operating elements disposed on both ends of the rotation axle. The control guides are oriented in the same direction here and the operating elements are rotatably supported in the housing independently of each other.

For optimal, space saving disposition of the functional elements of the adjustment device, the spring element is disposed between one operating element and one pinion and the brake device is disposed between the other operating element and the other pinion.

The operating element can either be designed as a manually operably rotary knob or as a motor-driven shaft, which is connected to the rotation axle directly or via a countershaft.

To ensure the accurate, smooth, linear movement of the optical tube the tube is connected to the housing by means of a guide device oriented parallel to the optical axis of the spotlight or optical device, wherein the guide device contains two diametrically opposed, mutually engaging pairs of guide elements and the guide rails preferably each comprise a box-shaped guide rail protruding from the outer wall of the tube, which respectively engage in a longitudinally displaceable manner in a guide rail in the form of a recess in the inner wall of the housing and comprising a cross-sectional profile matching the box-shaped guide rail.

BRIEF DESCRIPTION OF THE DRAWINGS

The idea underlying the invention is explained in detail using an exemplary embodiment illustrated in the figures.

DETAILED DESCRIPTION

Figure 1:
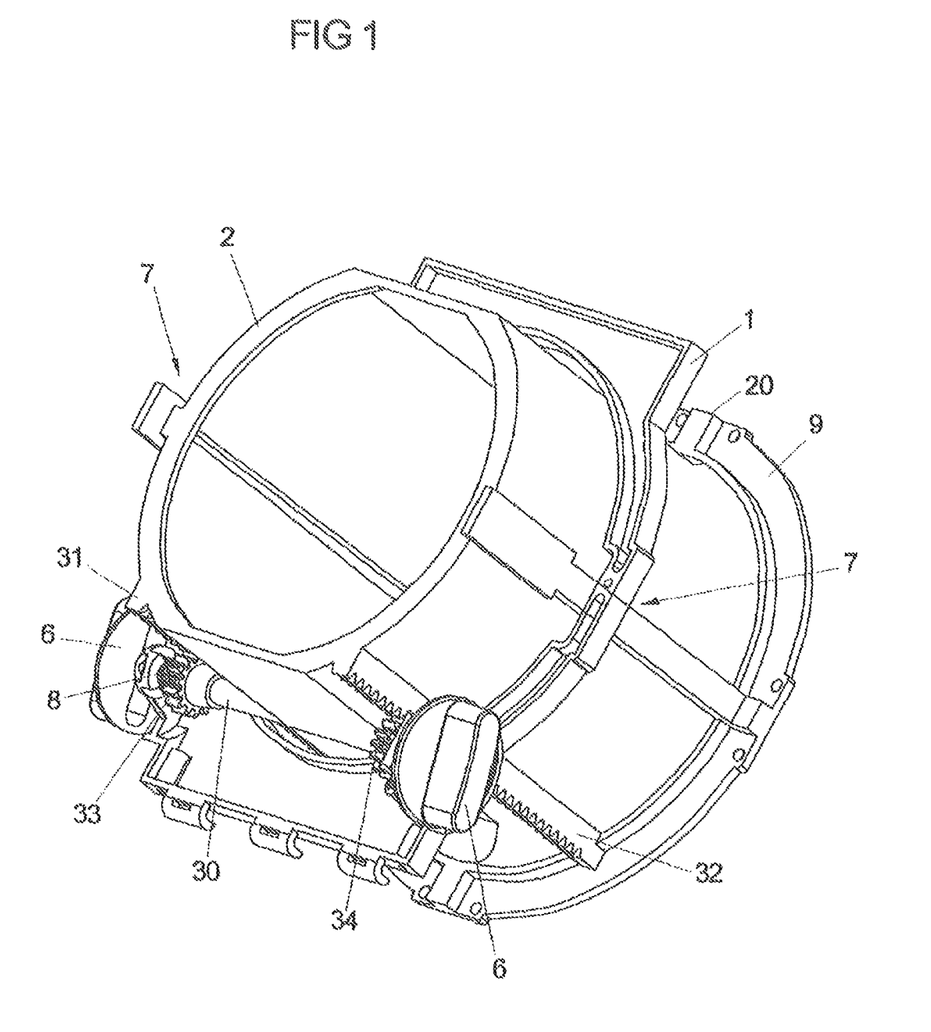
FIG. 1 shows a perspective illustration of a tube longitudinally displaceably mounted in a spotlight housing and a device for adjusting the tube along the optical axis of the spotlight.
Figure 2:
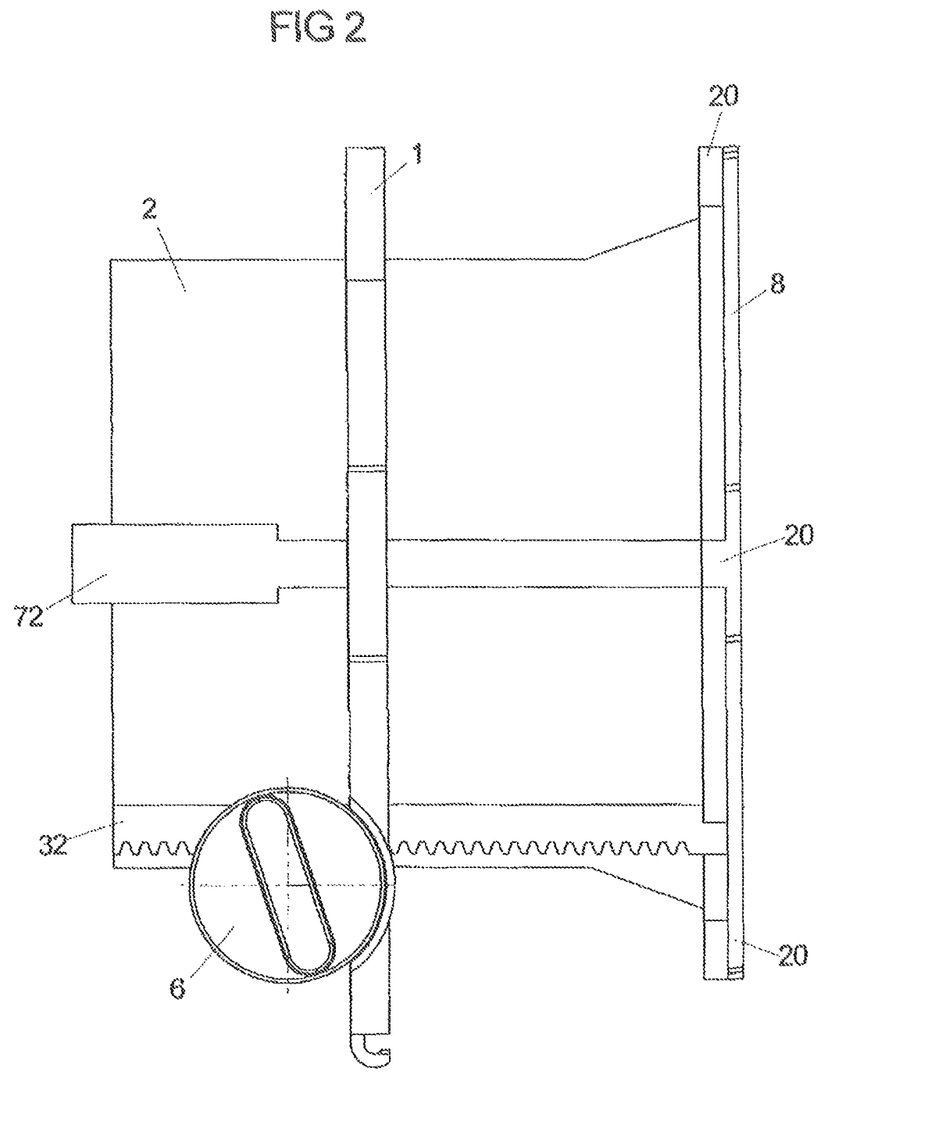
FIG. 2 shows a lateral view of the tube mounted in the spotlight housing an the device for adjusting the tube along the optical axis of the spotlight.
Figure 3:
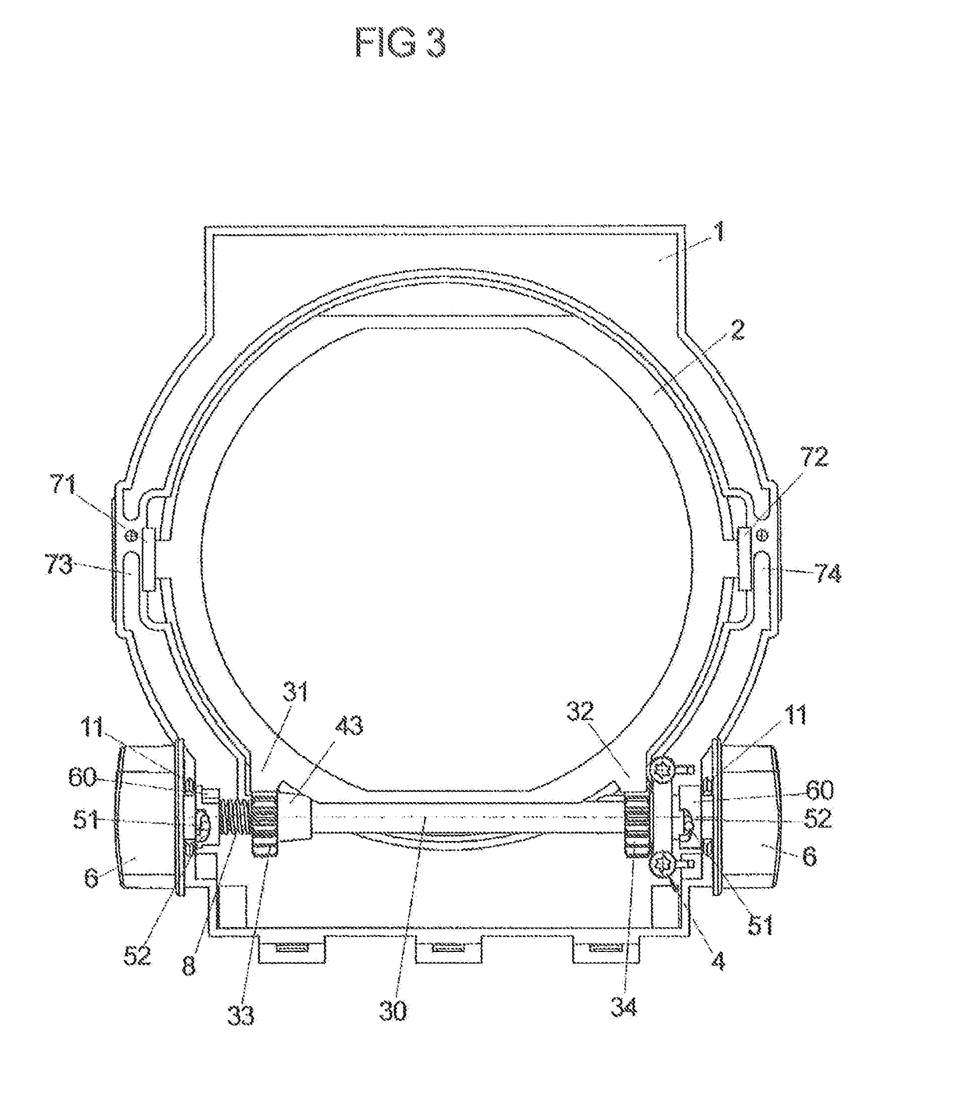
FIG. 3 shows a cross-section through the spotlight according to FIGS. 1 and 2 oriented perpendicular to the optical axis of the spotlight.

FIG. 1 shows in a perspective or isometric view, FIG. 2 in a lateral view and FIG. 3 in cross-section parts of a spotlight with a housing 1 and a cylindrical tube 2 adjustable along the optical axis of the spotlight. The housing 1 is illustrated in a frame-like manner for better recognition of the tube 2 and its guide and a device for adjusting the tube 2 along the optical axis of the spotlight.

A plurality of holders 20 for spotlight accessories 9, such as e.g. mutually relatively adjustable lens plates, a swing gate, grid, diffuser, scrims, gobos, holographic scattering films or similar are disposed on the frontal opening of the tube 2 in the direction of light radiation and distributed on the periphery, whilst e.g. a light shaping device in the form of a field lens is disposed in the light radiation opening of the tube 2.

The tube 2 preferably consists of a plastic injection molded part and is accurately mounted in the housing 1 by means of two guide devices 7 arranged diametrically opposed relative to each other and axially longitudinally adjustable in the housing 1 in the direction of the optical axis of the spotlight. The guide device 7 consists of two pairs of guide rails 71, 73 and 72, 74 each with a box-shaped guide rail 71 or 72 protruding from the sides of the cylindrical tube 2 and each provided with a guide rail 73, 74 in the form of a recess in the inner wall of the housing 1, which has a profile matching the box-shaped guide rail 71, 72.

An adjustment drive is provided for adjusting the tube 2 along the optical axis of the spotlight, comprising two toothed racks 31, 32 connected to the tube 2 or formed on the outer wall of the tube 2 and two pinions 33, 34 that mesh with the toothed racks 31, 32. According to the illustrations in FIGS. 1 and 3, the toothed racks 31, 32 are disposed in the lower region of the tube 2 in a plane extending parallel to the plane of the pairs of guide elements 71, 73 or 72, 74 so as to be offset relative to the pairs of guide rails 71, 73 or 72, 74. The pinions 33, 34 are disposed on a common rotation axle 30 and connected to the same so as to rotate therewith. Accurate, smooth linear adjustment of the tube 2 along the optical axis of the spotlight is guaranteed by means of the dual-sided mounting in the pairs of guide rails 71, 73 or 72, 74 and by means of the dual support of the toothed racks 31, 32 on the pinions 33, 34.

The rotation axle 30 of the adjustment drive is mounted so as to be adjustable in angle in cylindrical fittings 60 of two operating elements 6 disposed on the ends of the rotation axle 30 and in the form of manually operated rotary knobs, wherein the operating elements 6 are rotatably mounted in mountings 11 of the housing 1. The rotation axle 30 is mounted within the fittings 60 of the operating elements 6 and is thus also axially adjustable relative to the housing 1. Because the pinions 33, 34 are connected to the rotation axle 30 so as to rotate therewith, the pinions 33, 34 are likewise adjusted axially during an axial adjustment of the rotation axle 30. In order to guarantee thereby the engagement of the teeth of the pinions 33, 34 in the teeth of the toothed racks 31, 32 over the entire tooth width, the teeth of the pinions 31, 34 are made wider than the teeth of the toothed racks 32 by the magnitude of the axial adjustability of the rotation axle 30.

Figure 4:
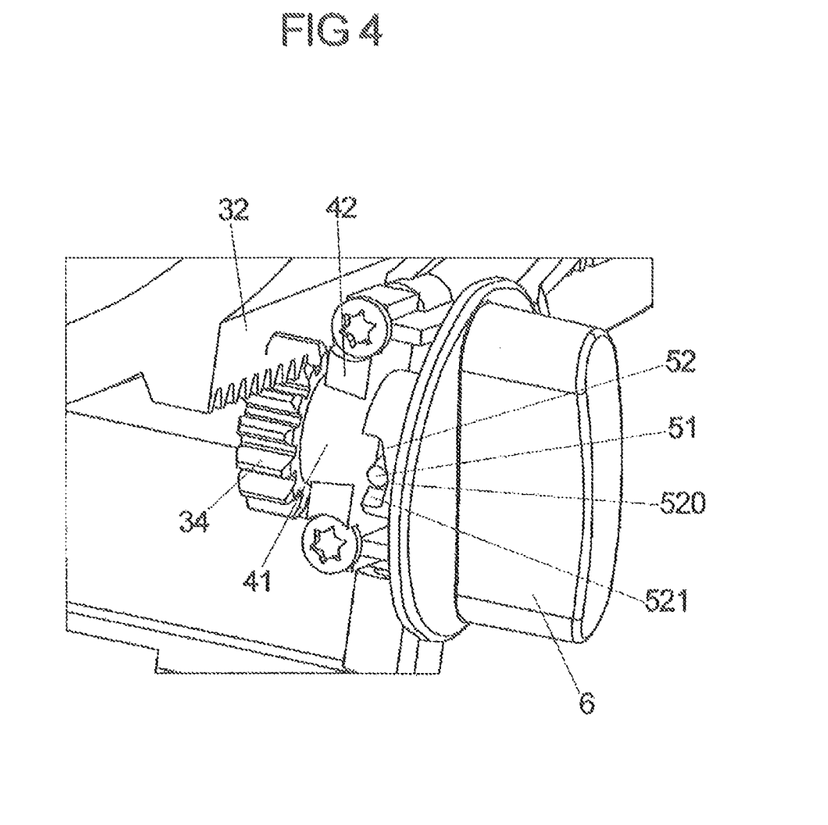
FIG. 4 shows an enlarged perspective illustration of the adjustment drive and the brake device for displacing the tube along the optical axis of the spotlight.
Figure 5:
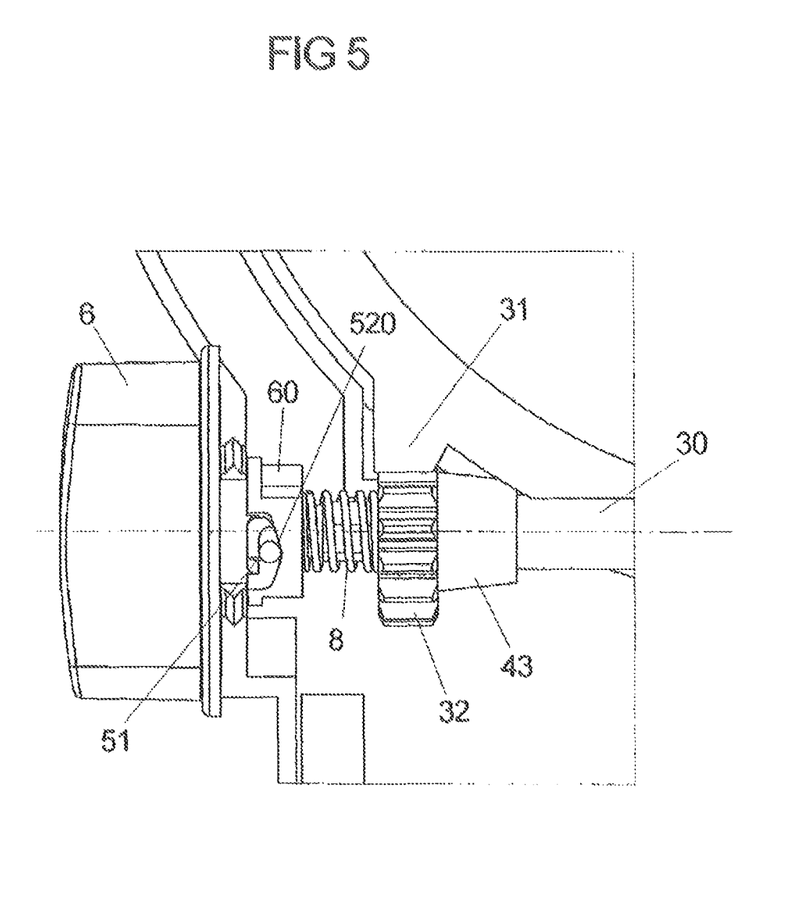
FIG. 5 shows an enlarged perspective illustration of the control device and of a portion of the adjustment drive according to FIG. 4.

As can especially be seen in FIGS. 3 through 5, on one end of the axially adjustable rotation axle 30 a conical frustum-shaped brake body or brake cone 41 of a brake device 4 is also connected no the rotation axle 30 so as to rotate therewith and in this embodiment is joined in one piece to the pinion 34. The brake cone 41 passes through a hollow conical frustum-shaped brake bearing 42, which is attached to the housing 1. The pinion 33 on the other end of the rotation axle 30 and connected to the rotation axle 30 so as to rotate therewith is also joined in one piece to a brake cone 43. A brake bearing can also be associated with said brake cone 43 if this is necessary to enhance the brake force.

Between the pinion 33 on the other end of the rotation axle 30 that is connected to the rotation axle 30 so as to rotate therewith and the cylindrical fitting 60 of the operating element 6, in this embodiment a spring element 8 in the form of a coil spring is coaxially fitted onto the rotation axle 30 and acts so that in the rest position of the tube 2 the brake cone 41 of the brake device 4 is in frictional or non-positive locking contact with the hollow conical frustum-shaped brake bearing 42 of the brake device 4, so that the brake device 4 is active and prevents an unwanted adjustment of the tube 2 away from said adjustment.

Alternatively or for additional biasing of the axially adjustable rotation axle 30 in the direction of a non-positive locking engagement of the brake cone 41 in the brake bearing 42 of the brake device 4, a spring element in the form of a tension spring can be provided between the cylindrical fitting 60 of the operating element 6 disposed on the side of the brake device 4 and the brake cone 41.

For axial adjustment of the rotation axle 30, control devices 51, 52 are provided between the operating elements 6 accepting the rotation axle 30 and used for operating the adjustment drive and the ends of the rotation axle 30, which consist of control pins 51, 52 disposed in the end region of the rotation axle 30 and protruding perpendicularly from the rotation axle 30 and control guides 52 formed in the cylindrical fittings 60 of the operating elements 6, in which the control pins 51 engage. The control guides 52 formed in the cylindrical fittings 60 of the operating elements 6 are oriented in the same direction and have a curved contour, which is formed symmetrically with respect to an apex 520 and comprise end stops 521 on both ends. In the braked rest position of the tube 2 the control pins 51 are located at the apexes 520 of the curved paths of the control guides 52 because of the bias of the rotation axle 30 from the effect of the spring element 8.

Because of the matching orientation of the control guides 52, the curved path of one control guide 52 is disposed on the outside of the cylindrical fitting 60 and the curved path of the other control guide 52 is disposed within the cylindrical fitting 60.

If one of the two operating elements 6 is rotated by an angle that can be specified, then—because of the rotatable mounting of the ends of the rotation axle 30 in the cylindrical fittings 60 of the operating elements 6—each of the two control pins 51, which rests on the control guide 52 of the relevant operating element 6, must follow the control guide 52 in which it engages because of the bias of the spring element 8. By the rigid connection of the control pins 51 to the rotation axle 30, the rotation axle 30 is axially displaced by she angular adjustment of the relevant control pin 51, so that the brake cone 41, which has a non-positive locking connection to the brake bearing 42 in the rest position of the tube 2, is displaced and the frictional connection or non-positive locking connection between the brake cone 41 and the brake bearing 42 of the brake device 4 is thereby released. With further rotation of the operating element 6 over the predetermined angle the control pin 51 contacts the end stop 521 of the control guide 52. Thereby a positive locking connection is made from the operating element 6 via the end stop 521 of the control guide 52 to the cylindrical fitting 60 of the operating element 6, the control pin 51, the rotation axle 30 and the pinions 33, 34 connected to the rotation axle 30 so as to rotate therewith. Said positive locking causes the unbraked tube 2 following release of the brake device 4 to be adjusted along the optical axis of the spotlight by means of the meshing of the teeth of the pinion 33, in the teeth of the toothed racks 31, 32 with the further rotation of the operating element 6 of the tube 2.

If the target adjustment of the tube 2 is achieved and the rotation of the operating element 6 is finished, then the tube 2 remains stationary and the rotation axle 30 is axially returned into its initial position by the effect of the spring element 8, wherein the control pin 51 slides along on the curved contour of the control guide 52 until it has reached the apex 520 of the control guide 52. In said axial position of the rotation axle 30 the brake cone 41 is again connected in a non-positively locked manner to the brake bearing 42, so that the tube 2 is fixed at the relevant adjustment. The previously operated operating element 6 is thereby rotated back into the rest position, in which the control pin 52 again comes to lie at the apex 520 of the curved path of the control guide 52.

Operation of the other operating element 6 leads to the same, previously described functional steps or releasing the brake device 4, for making the positive locking connection of the relevant operating element 6 via the end stop 521 of the curved path of the control guide 52, the control pin 51, the rotation axle 30 and the pinions 33, 34 connected to the rotation axle 30 so as to rotate therewith to the teeth of the toothed racks 31, 32 on the outer wall of the tube 2 that are meshed with the teeth of the pinions 33, 34.

Figure 6:
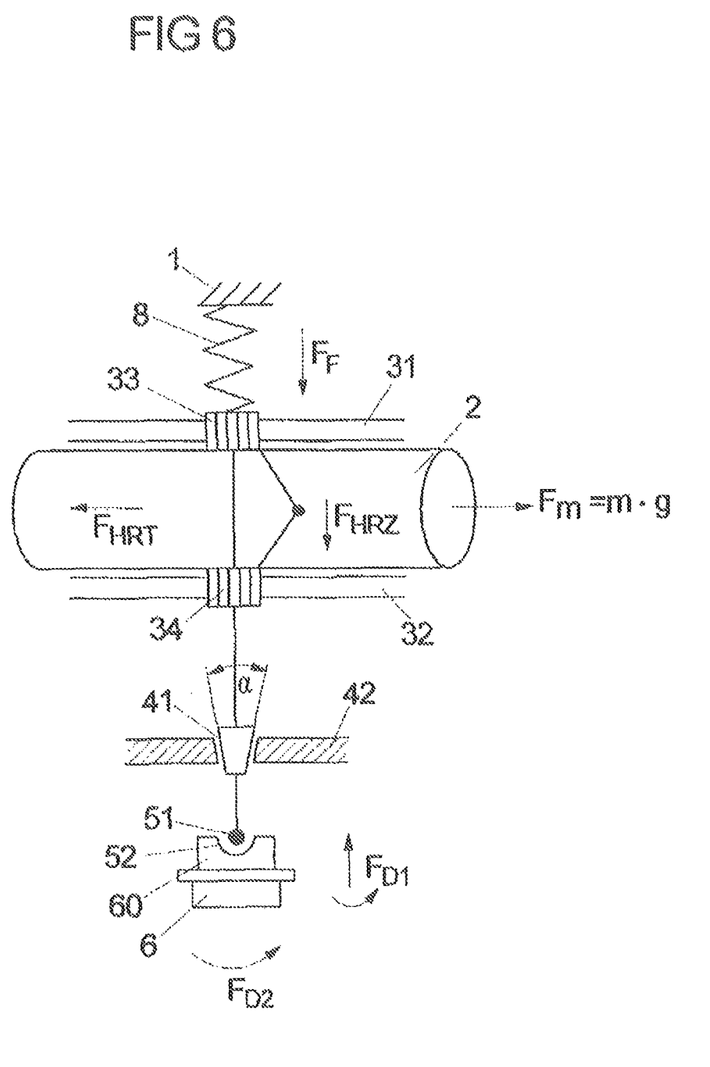
FIG. 6 shows a schematic illustration of the functional elements of the adjustment device and the forces acting in the adjustment device.

FIG. 6 shows a schematic illustration of the functional elements of the adjustment device and the forces, torques and coefficient of friction involved when fixing the tube 2 in the rest position and when adjusting the tube 2, wherein the reference characters listed in FIG. 6 for the schematically illustrated functional elements of the adjustment device match the previously described reference characters of the functional elements. In said schematic illustration the reference characters have the following meanings:

$F_{D2}$ The rotary force necessary for adjusting the tube
$F_{HRT}$ the static frictional force of the tube (tube resistance)
$F_F$ the spring force exerted by the spring element
$F_m$ the weight of the tube
$F_{HRB}$ the brake force of the brake device
$F_{D1}$ the brake release force to be applied to the operating element that is necessary for releasing the brake device
$F_{HRZ}$ the axial static friction force of the teeth of the pinion/toothed rack For proper operation of the adjustment device it is necessary that
1. The tube 2 is fixed in its rest or initial position independently of the operating position of the spotlight, i.e. independently of the orientation of the optical axis of the spotlight. In order to fix the tube in the rest position the condition applies that the brake force $F_{HRB}$ is greater than the weight $F_m$ of the tube 2 minus the static friction force $F_{HRT}$ of the tube 2

$$F_{HRB} > F_m - F_{HRT}$$

The necessary static friction of the tube thus results following conversion as $$F_{HRT} > F_m - F_{HRB}$$

or because of the dependency of the static friction force $F_{HRT}$ of the tube 2 on the spring force $F_F$ of the spring element, the coefficient of friction μ and the conical frustum angle α as $$F_{HRB} = F_F * \frac{\pi * \mu}{2\sin\frac{\alpha}{2}}$$

$$F_{HRT} > F_m - F_F * \frac{\pi * \mu}{2\sin\frac{\alpha}{2}}$$

2. with the introduction of a longitudinal adjustment of the tube 2 the tube 2 must remain fixed in its rest position or initial position until the brake device 4 is fully released. In order to prevent an adjustment movement of the tube when releasing the brake device, the disengagement force $F_{D1}$ must be smaller than the static frictional, force $F_{HRB}$ of the tube 2 minus the weight $F_m$ of the tube 2:

$$F_{D1} < F_{HRT} - F_m$$

3. the disengagement force $F_{D1}$ for releasing the brake device is greater than the spring force $F_F$ plus the static friction force $F_{HRZ}$ of the teeth $$F_{D1} > F_F + F_{HRZ}$$

4. for adjusting the tube 2 the rotational force $F_{D2}$ acting on the operating element 6 is greater than the sum of the static friction force $F_{HRB}$ of the tube 2 and the spring force $F_F$ $$F_{D2} > F_{HRT} + F_F$$

5. for resetting the rotation axle following an adjustment movement of the tube 2 the spring force $F_F$ is greater than the static friction force $F_{HRZ}$ resulting from the static friction of the teeth $$F_F > F_{HRZ}$$

It follows from the above conditions that the frictional force or the resistance of the tube 2 against, an adjustment movement must be by far the greatest force so that a significant feature for proper operation of the adjustment device is a high base friction or braking of the tube 2 in its guide.

The brake force and hence the dimensioning of the brake device 4 are therefore designed for proper operation of the adjustment device. This depends essentially on the dimensions of the mutually engaged areas of the brake cone 41 and of the brake bearing 42 and on the coefficient of friction of the brake surfaces and hence on the material of the brake cone 41 and brake bearding 42 or on the material of the surfaces of the brake cone 41 and brake bearing 42. Because small dimensions of the brake device 4 are also desired for minimizing the installation space of the adjustment device, the effective area of the brake cone 41 and brake bearing 42 is limited, so that the effect of the brake device 4 depends significantly on the coefficient of friction.

The coefficient of friction can be increased by means of a suitable surface design of the brake cone 41 and brake bearing 42, e.g. by means of a suitable surface structure, or by the use of materials with high coefficients of friction. Thus e.g. a coating of the surfaces of the brake cone 41 and brake bearing 42 or the use of suitable inserts of a soft bearing material, such as e.g. rubber, can cause a high coefficient of friction, if at the same time it is ensured by means of a suitable material selection and possibly design boundary conditions that no increased wear or only slightly increased wear occurs and the risk of shearing off of the surface material involved can be eliminated.

With a specific exemplary embodiment of the adjustment device according to the invention, the displaced mass of the tube is 5.0 kg, the coefficient of friction of the brake device μ=0.3 and the cone angle of the brake cone or brake bearing α=60°. A rotational force $F_{D2}$ for moving the tube of 90 N, a static friction $F_{HRT}$ of the tube of 70 N, a brake release force or force $F_{D1}$ for disengaging the brake device of 12 N, a spring force $F_F$ of the spring element of 10 N and an axial static friction force $F_{HRZ}$ of the sprockets of 1 N result in a weight $F_m$ of 49.05 N and a brake force $F_{HRB}$ of 9.42 N.

With the above exemplary embodiment the above-mentioned conditions for proper operation of the adjustment device are fulfilled.

The invention claimed is:

1. A device for adjusting an optical tube, which is disposed in a housing of a spotlight or optical device and which is guided in the housing in the direction of the optical axis of the spotlight or optical device, with an adjustment drive, an operating element and a brake device disposed between the tube and the housing, which with the adjustment drive not activated connects the tube to the housing in a non-positive locking and/or positive-locking manner and which on activation of the adjustment drive releases the connection between the tube and the housing and enables adjustment of the tube along the optical axis of the spotlight or optical device, wherein the adjustment drive can be coupled by means of a control device that activates or deactivates the brake device to the operating element such that on operating the operating element the brake device releases the connection between the tube and the housing, on further operation of the operating element the adjustment drive adjusts the tube along the optical axis of the spotlight or optical device and on terminating operation of the operating element the brake device again connects the tube to the housing in a non-positive locking and/or positive locking manner.

2. The adjustment device as claimed in claim 1, wherein the adjustment drive consists of a linear drive with a positive-locking element connected to the tube and oriented parallel to the optical axis of the spotlight or optical device and an adjustment element connected to the housing and engaged with the positive-locking element.

3. The adjustment device as claimed in claim 2, wherein the positive-locking element consists of a toothed rack disposed on the outer surface of the tube and oriented parallel to the optical axis of the spotlight or optical device and the adjustment element consists of a pinion meshing with the teeth of the toothed rack, which is connected to a manually driven or motor-driven, axially displaceable rotation axle so as to rotate therewith.

4. The adjustment device as claimed in claim 3, wherein the rotation axle can be coupled to the manually driven or motor-driven operating element by means of the control device for activating or deactivating the brake device.

5. The adjustment device as claimed in claim 4, wherein the brake device consists of a hollow conical brake bearing attached to the housing and a brake cone attached to the rotation axle and disposed within the hollow conical brake bearing, which during axial displacement of the rotation axle in one direction makes a non-positive locking connection to the hollow conical brake bearing and in the opposite direction removes the positive locking connection to the hollow conical brake bearing.

6. The adjustment device as claimed in claim 5, wherein the mutually opposed surfaces of the brake cone and of the brake bearing have a high coefficient of friction.

7. The adjustment device as claimed in claim 5, wherein the brake cone and the brake bearing comprise mutually opposed profiled surfaces or the surfaces of the brake cone and of the brake bearing are provided with a soft bearing material, especially with rubber.

8. The adjustment device as claimed in claim 4, wherein the control device comprises a control pin protruding from the rotation axle, which engages in a control guide, wherein the control guide is designed such that the rotation axle is axially oriented in a neutral rest position such that the brake cone is connected to the brake bearing in a non-positive locking and/or positive-locking manner, and during driving of the operating element in one or other rotation direction is axially displaced such that the non-positive locking and/or positive-locking connection of the brake cone and the brake bearing is released.

9. The adjustment device as claimed in claim 8, wherein the control guide is formed on a cylindrical fitting of the operating element, which accepts an end of the rotation axle comprising the control pin and can be rotationally adjusted relative to the rotation axle.

10. The adjustment device as claimed in claim 9, wherein a spring element biasing the brake cone in the non-positive and/or positive locking connection to the brake bearing is disposed between the fitting and the pinion that are connected to the rotation axle.

11. The adjustment device as claimed in claim 1, wherein the positive-locking element consists of two toothed racks disposed at a distance apart on the outer surface of the tube and oriented parallel to the optical axis of the spotlight or optical device and the adjustment element consists of pinions that are meshed with the teeth of the toothed rack and which are connected to a manually driven or motor-driven, axially displaceable rotation axle so as to rotate therewith, that both ends of the rotation axle comprise a control pin protruding perpendicularly from the rotation axle and that the control pins each engage in a control guide in a fitting of operating elements disposed on both ends of the rotation axle, wherein the control guides are oriented in the same direction.

12. The adjustment device as claimed in claim 11, wherein the operating elements are mounted in the housing so as to be rotatable mutually independently.

13. The adjustment device as claimed in claim 1, wherein the spring element is disposed between one operating element and one pinion and the brake device is disposed between the other operating element and the other pinion.

14. The adjustment device as claimed in claim 1, wherein the operating element(s) is/are designed as manually operable rotary knob(s).

15. The adjustment device as claimed in claim 1, wherein the tube is connected to the housing by means of a guide device oriented parallel to the optical axis of the spotlight or optical device.

16. The adjustment device as claimed in claim 15, wherein the guide device contains two diametrically opposed pairs of guide elements that engage within each other.

17. The adjustment device as claimed in claim 16, wherein the pairs of guide rails each comprise a box-shaped guide rail protruding from the outer wall of the tube, each of which engages, in a longitudinally adjustable manner, a guide rail in the form of a recess in the inner wall of the housing, which has a cross-sectional profile matching the box-shaped guide rail.

18. The adjustment device as claimed in claim 1, wherein the static friction of the guide rails is greater than the frictional force between the brake cone and the brake bearing of the brake device that can be connected to the brake cone in a non-positively locked manner.

19. The adjustment device as claimed in claim 1, balls, rollers are disposed between the guide rails of the pairs of guide rails or plastic with good sliding properties is provided.

20. The adjustment device as claimed in claim 1, wherein the rotation axle is connected to an additional brake device that inhibits the rotation of the rotation axle and thus inhibits independent movement of the tube.

\* \* \* \* \*